Patented Mar. 11, 1930

1,750,460

UNITED STATES PATENT OFFICE

CLARENCE M. CARSON, OF AKRON, OHIO, ASSIGNOR TO THE GOODYEAR TIRE & RUBBER COMPANY, OF AKRON, OHIO, A CORPORATION OF OHIO

COMPOSITION OF MATTER AND METHOD OF EMPLOYING SAME

No Drawing.   Application filed January 6, 1927. Serial No. 159,511.

My invention relates to a composition of matter which is particularly adapted to be used as a coating for fabrics to render them impermeable to gases.

The primary object of the invention resides in the provision of a composition of matter that may be applied readily to material such as balloon fabric and which shall render it impermeable to gas enclosed within a container formed from the fabric.

Heretofore, gold beater's skin has been universally employed as a coating for fabric gas containers of balloons, but the available supply of this substance is so limited that some other material must be employed for the same purpose. A satisfactory material must be impermeable to inflating gas, such as hydrogen, and it must also be of such character as to leave the fabric soft or flexible after it has been applied thereto. Many compositions of matter, which have been employed for the purpose of gas-proofing a fabric, absorb moisture, which results in deterioration of the film, or else they dry out and crack when the fabric is flexed.

I have discovered that gelatinous materials, such as glue or gelatin, or mixtures of the same, may be mixed with rubber dispersions, such as latex, to provide a composition of matter that may be employed satisfactorily as a coating material for fabrics. In a general way, it may be said that a mixture of materials of this nature produces a desirable coating, since both have similar electrical charges upon their particles which mutually prevent coagulation or precipitation of each other, and thereby form a homogeneous film when the composition is applied to the fabric and dried. Various proportions of these ingredients may be utilized to form films having slightly different characteristics which are adapted for various specific applications.

Attempts have been made in the past to substitute a coating of glue and glycerin for gold beater's skin, but this composition is obviously objectionable, as it softens when wet. Latex has also been used as coating for tire fabrics to give them adhesiveness. I do not believe, however, that any attempt has been made to mix latex and proteins to provide an impermeable coating to balloon fabric and like material.

A typical composition may be made by swelling 50 grams of glue or like material in a sufficient quantity of water to form a liquid at a temperature of 35° C. to 40° C. 25 grams of glycerin are added to the glue and the total volume is brought to about 300 cubic centimeters by the addition of water. To this colloidal solution is then added 200 cubic centimeters of latex, both being lukewarm in order to prevent any separation of the dispersed particles, and to aid in the better union of the colloidal materials. The emulsion thus formed may be employed as a composition of matter for coating materials such as balloon fabrics. The foregoing composition has a consistency, depending upon the temperature, between a thin paste and a liquid, and it may be used as an element-proofing agent or "dope" without further treatment. The composition has a high electrical conductivity which renders it particularly desirable for use in aeronautics.

The following composition of matter may also be employed for a fabric which is not subjected to excessive bending or flexing:

25 parts gelatin.
15 parts dextrose.
250 parts water.
75 parts rubber latex containing 37% rubber.

The foregoing composition when applied to a fabric will give a hydrogen diffusion under 30 millimeters pressure of 0.1 liter per square meter in 24 hours. The dextrose, which is employed primarily as a softening agent, may be replaced by other materials which serve the same purpose, as for example, Turkey red oil, or a triglyceride, such as tri-olein.

Another composition of matter, which will form a more flexible film than that given in the preceding example, may be made from the following ingredients:

50 parts gelatin.
500 parts water.
6 parts glycerin.
150 parts latex containing 37% rubber.

This material when tested also gave a hydrogen diffusion of 0.1 liter per square meter in 24 hours.

The addition of fibrin to the latex-gelatin composition has been found to result in a very excellent product. Fibrin is a protein found in clotted blood, and is the agent that coagulates to cause the clotting. A composition compounded as follows has very desirable properties:

40 parts gelatin.
10 parts fibrin.
30 parts glycerin.
200 parts latex (37% rubber).
300 parts water.

This composition gives 0.1 liters diffusion per square meter in 24 hours. This rate is not appreciably increased by vigorous creasing and wrinkling of the coated fabric.

The fibrin is dissolved in solution made alkaline with potassium hydroxide, and hydrochloric acid is added to the coating material to neutralize the hydroxide which results in a chemical reaction that produces a small amount of potassium chloride, which salt is beneficial in that it makes the treated fabric a better conductor of electricity, and thus prevents the accumulation of static charges on the fabric.

The salt is also slightly hygroscopic and this property helps to keep the coating soft and pliable.

In order to render the film less liable to cracking when the fabric is flexed, it is desirable to maintain the ratio between the latex and the gelatin, or other protein composition, relatively high. Thus, in the foregoing examples it will be noted that the ratio of latex to gelatin is 3 to 1, or more.

The employment of latex as a convenient form of rubber is particularly desirable, as a water solution of rubber renders the incorporation of other substances a comparatively simple matter. Protein compounds such as glue, gelatin, casein, and albumen are desirable due to their resistance to gas diffusion through a film containing them. In ordinary cases a film of protein material is rather hard and brittle, and hence it is also desirable to incorporate a softening agent, such as glycerin, dextrose, ethylene-glycol, wax or like material. All of these substances can be used in a protein-latex mixture without destroying the stability of the emulsion.

While various means may be employed to apply the composition to fabric, it is preferred to convey the fabric through a bath of the colloidal solution to form the coating which saturates the fabric. After the material is partially dried, a fixing agent, as, for example, formaldehyde, which tans the gelatin is sprayed thereon.

The application of a precipitating or tanning agent to the composition after it has been applied as a film on the fabric prevents the absorption of moisture which would cause deterioration of the film in a damp climate. Preferably, the tanning agent is applied after the film is formed, because if it were added directly to the composition prior to the application thereof, there would be a tendency for a precipitation that would affect the material adversely.

From the foregoing description it will be apparent that I have provided a new composition of matter which may be utilized to form impervious films for balloon fabrics. Films formed from my composition are superior to films of gold beater's skin because they form a perfectly homogeneous mixture which shows no tendency to peel away from the fabric, but which becomes, in effect, an integral part thereof. Obviously, the various specific compositions enumerated above are merely illustrative and likewise the material may be employed for other purposes. It is intended, therefore, that the invention should be limited only by the scope of the following claims.

What I claim is:

1. A method of rendering a balloon fabric impermeable to inflating gas which comprises applying thereto a coating material containing latex and fibrin.

2. A method of rendering a balloon fabric impermeable to inflating gas which comprises applying thereto a coating material containing latex, fibrin and a softening agent.

3. A method of rendering a balloon fabric impermeable to inflating gas which comprises applying thereto a coating material containing latex, fibrin and glycerine.

4. A method of rendering a balloon fabric impermeable to inflating gas which comprises applying thereto a coating material containing latex, fibrin and a hygroscopic salt which is chemically inert toward the other ingredients in the composition.

5. A method of rendering a balloon fabric impermeable to inflating gas which comprises applying thereto a coating material containing latex, fibrin and a hygroscopic salt, said salt being potassium chloride.

6. A method of rendering balloon fabric impermeable to inflating gas which comprises applying to said fabric a coating material containing latex, a protein and a hygroscopic electrically conductive salt, said salt being potassium chloride.

7. A balloon fabric coated with a material containing latex and fibrin.

8. A balloon fabric coated with a material containing latex, fibrin and a softening agent.

9. A balloon fabric coated with a material containing latex, fibrin and a hygroscopic electrically conductive salt which is chemically inert toward the other ingredients in the material.

10. A balloon fabric coated with a material containing latex, fibrin and a hygroscopic electrically conductive salt, said salt being potassium chloride.

11. A woven balloon fabric coated with a material containing as its principal components, a protein latex, a softening ingredient and an electrically conductive salt which is chemically inert toward the other ingredients in the coating material.

12. A balloon fabric coated with a material containing latex, fibrin, glycerine and potassium chloride.

13. A method of rendering a balloon fabric impervious to inflating gas which comprises applying to the surface thereof a film of material including latex intermixed with gelatin, subsequently wetting the surface of the film with a solution of a substance capable of tanning the gelatin and drying the film.

In witness whereof, I have hereunto signed my name.

CLARENCE M. CARSON.